United States Patent [19]

Pruzin

[11] Patent Number: 5,366,256
[45] Date of Patent: Nov. 22, 1994

[54] SPRING RETAINERS FOR HOSE COUPLINGS

[76] Inventor: Michael J. Pruzin, 4308 Beaver Ave., Fort Wayne, Ind. 46807

[21] Appl. No.: 198,065

[22] Filed: Feb. 18, 1994

[51] Int. Cl.$^5$ .............................................. F16L 3/08
[52] U.S. Cl. ........................................ 285/62; 285/162; 285/205
[58] Field of Search ................ 285/162, 194, 205; 74/502.4; 403/197

[56] References Cited

U.S. PATENT DOCUMENTS

| | | |
|---|---|---|
| 2,062,449 | 12/1936 | Dick ................................ 285/205 X |
| 2,869,905 | 1/1959 | Bratz ............................... 285/162 X |
| 2,954,248 | 9/1960 | Brickman . |
| 3,366,405 | 1/1968 | Sevrence . |
| 3,528,313 | 9/1970 | Berno . |
| 4,131,379 | 12/1976 | Gordy et al. ................ 285/162 X |
| 4,304,148 | 12/1981 | Hamman . |
| 4,304,149 | 12/1981 | Heimann . |
| 4,324,503 | 4/1982 | Serrence ........................ 285/162 X |

Primary Examiner—Dave W. Arola

[57] ABSTRACT

An end coupling for a brake hose is retained in an opening through a chassis bracket by a spring assembly comprised of a wave spring and an anchor spring. The wave spring engages a first surface of the bracket with portions of an undulating surface while the anchor spring engages a second surface of the bracket with a plurality of flared tangs.

11 Claims, 3 Drawing Sheets

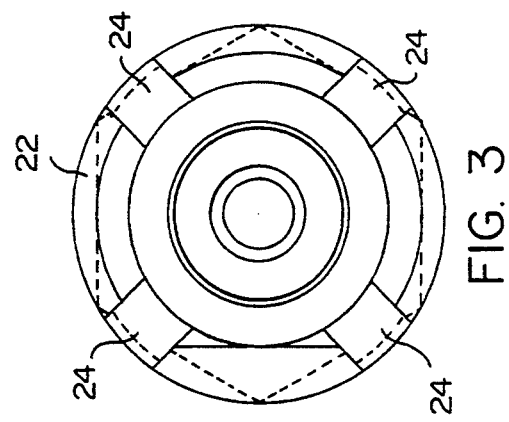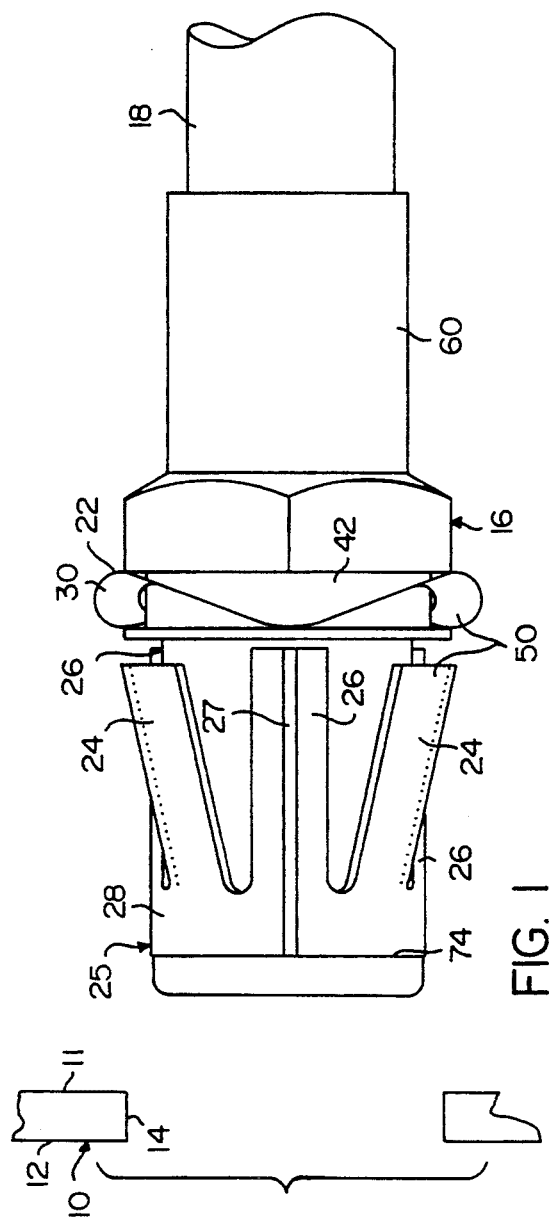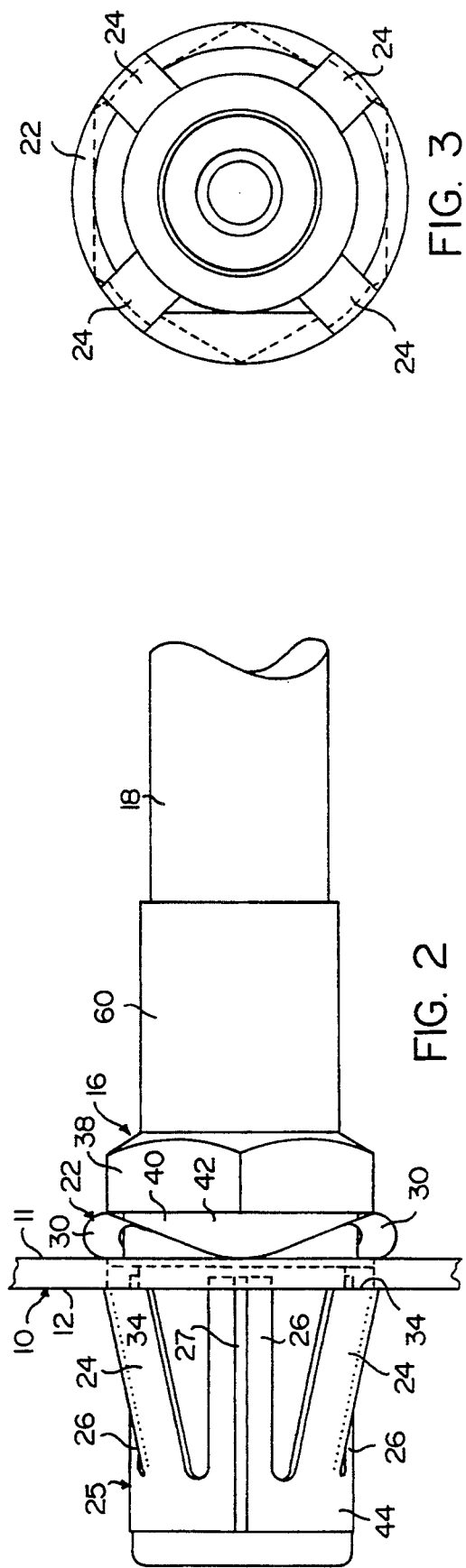

SPRING RETAINERS FOR HOSE COUPLINGS

BACKGROUND OF THE INVENTION

1. Field of the Invention

The present invention relates to spring retainers for hose couplings. More particularly, the present invention relates to spring retainers for securing hose couplings to mounting members in automotive vehicles and the like.

2. Background of the Invention

The brakes of automotive vehicles are operated by hydraulic pressure transmitted through hydraulic hoses from a master cylinder to pairs of wheel brakes positioned at the ends of front and rear axles. In at least one vehicle model, a bracket is mounted to the chassis proximate the rear axle of the vehicle. A coupling at the end of a reinforced brake hose from the master cylinder is secured in an opening through the bracket by a fiat retaining clip. The flat retaining clip is driven to home to seat around the coupling with a hammer. To an assembler, this may appear to be a relatively unimportant procedure and the retaining clip may either be overlooked or not seated properly when hit with the hammer. If the retaining ring is not in place, then the coupling will be loose when a tube fitting which connects the brakes, to tile hose is attached. If the clip is not in place, then the clip might be installed at this time or might be ignored. If the retaining clip is not firmly seated, tile detect might be overlooked during subsequent assembly. In any event, if the coupling is not positively retained by the clip, the coupling will move in the bracket and rattle.

In view of the aforementioned difficulties, there is a need for improvement in mounting the end couplings of brake hoses to the chassis of motor vehicles.

SUMMARY OF THE INVENTION

It is a feature of the present invention to provide a new and improved arrangement for mounting couplings such as the end couplings of hydraulic brake hoses used in automobiles.

The present invention is directed to an improvement in an assembly including a hose and an end coupling connected to the hose, wherein the end coupling includes a barrel with first and second ends, the first end being coupled to the hose and the second end being passed through an opening of a selected diameter in a panel to retain the barrel in the opening. A groove is positioned proximate the first end of the barrel and a shoulder facing the groove is positioned proximate the second end of the barrel. A spring washer is disposed in the groove, the spring washer having a diameter greater than the diameter of the opening through the panel to engage the first surface of the panel when the barrel is inserted through the opening. An anchor spring is disposed around the barrel in proximity to the shoulder at the second end of the barrel, the anchor spring having a collar for abutting the shoulder and radially expanded resilient portions. The radially expanded resilient portions are radially contractable from a diameter greater than the opening through the panel to a diameter less than the opening through the panel, whereby the radially expanded resilient portions contract upon inserting the barrel through the openings and re-expand engaging the second surface of the panel. The anchor spring cooperates with the spring washer so as to form a spring assembly for retaining the end coupling in the opening of the panel.

In a preferred embodiment, the radially expanded portions are configured as spring tangs cantilevered on the collar, the spring tangs having free ends for engaging the second surface of the panel.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1 is a side view of a brake hose with an end coupling thereon having a spring retainer assembly configured in accordance with the present invention, the end coupling being aligned with an opening in a chassis bracket prior to mounting the end coupling within the opening;

FIG. 2 is a view similar to FIG. 1 but showing the end coupling retained in the chassis bracket by the spring retainer assembly;

FIG. 3 is an end view of the end coupling of FIGS. 1 and 2;

DETAILED DESCRIPTION

Figure 4:
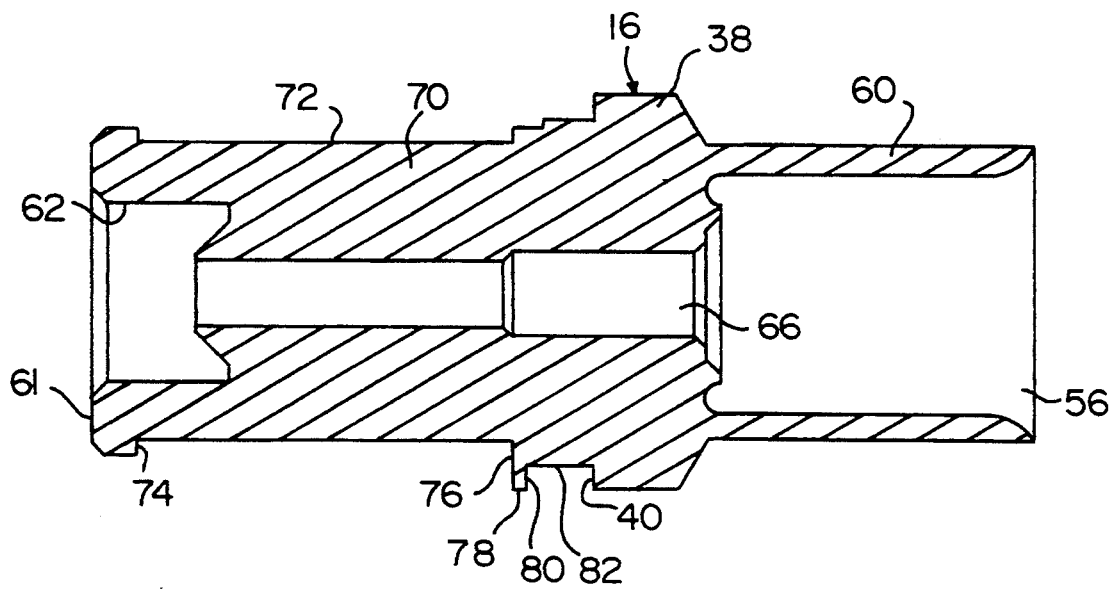
FIG. 4 is a side elevation of the end coupling without the spring retainer assembly thereon.

Referring now to FIG. 1, there is shown a bracket 10 which is in the form of a panel which is integral with the chassis of a motor vehicle (not shown). The bracket 10 could also be another structural element such as a frame rail or spring tower. The bracket 10 has a first surface 11 and an oppositely facing second surface 12. A circular opening 14 through the bracket 10 receives an end coupling 16 fixed to a reinforced hose 18 which contains hydraulic fluid. The present invention is of initial interest in the automotive industry and is of primary use in mounting nose end assemblies for hydraulic brake hoses. In accordance with one use, the bracket 10 is mounted proximate the rear axle (not shown) of a motor vehicle (not shown).

Referring now to FIGS. 2 and 3 in combination with FIG. 1, in order to mount the end coupling 16, the end coupling is advanced in the direction of arrow 20 through the circular opening 14 in the bracket 10 until it is stopped by a wave spring 22 which serves as a spring washer abutting the first surface 11 of the bracket. Upon pressing the end coupling 16 home, four anchor tangs 24 extending from an anchor spring 25 on the end coupling expand outwardly and engage the second surface 12 of the bracket 10, preventing movement of the coupling 16 back out of the opening 14. Thus, anchoring the coupling 16 and hose 18 to the bracket 10. In addition to the four anchor tangs 24, the anchor spring 25 includes four stabilizing tangs 26, one of which is split at cut 27 to allow mounting of the anchor spring 25 on the end coupling 16. The tangs 24 and 26 are unitary with a collar portion 28, the anchor tangs providing radially expandable, resilient portions for engaging the second surface 12 of the panel defined by bracket 10.

Considering the spring structure more specifically, the wave spring 22 has an undulating front surface 30 which abuts the first wall 11 of the bracket 10, while the anchor tangs 24 each have free ends 34 which engage the second wall 12 of the bracket. Behind the wave spring 22 is a unitary hex nut 38 on the end coupling 16 which has a nut face 40 engaging a rear surface 42 of the wave washer. The wave spring 22 cooperates with the anchor spring 25 to form a retaining spring assembly 50. The retaining spring assembly 50 is uniquely configured to cooperate with the end coupling 16 so that the end coupling 16 may be quickly and reliably mounted in the circular opening 14 through the bracket 10.

Figure 5:
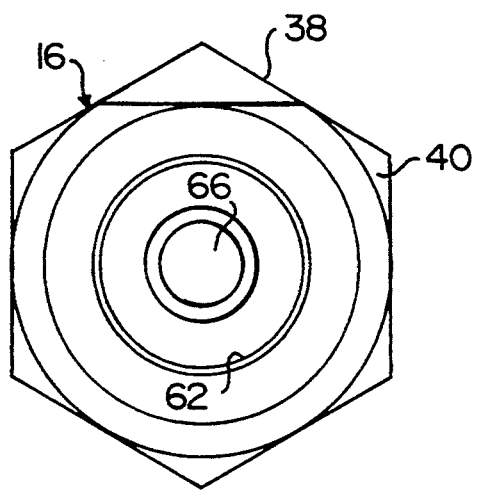
FIG. 5 is an end view of the end coupling of FIG. 4.

Referring now to FIGS. 4 and 5, where the end coupling 16 is shown in detail without the elements of retaining spring assembly 50 thereon, it is seen that the end coupling has a first end 56 with a crimping sleeve 60 into which the brake hose 18 (see FIGS. 1 and 2) is inserted and a second end 61 in which is disposed a threaded bore 62 in which a threaded nipple of a tubular brake fitting (not shown) is received. A reduced diameter bore 66 connects the first end 56 of the end coupling 16 to the second end 61. If, for example, the end coupling 16 is used to connect a hose having a ⅛th inch inner diameter, the bore 16 will have a diameter of about ⅛th inch. In a proposed commercial embodiment of the invention, the total length of the end coupling 16 is about 1.9 inches and the diameter, including the hex nut, is approximately 0.75 inches. Since the coupling 16 is relatively small, it can be somewhat difficult to manipulate when inserted into the opening 14 in the bracket 10 (see FIG. 1). The end coupling 16 has a relatively long barrel portion 70 with a cylindrical surface 72 disposed between an end shoulder 74 at a first end of the barrel and a first face 76 of a unitary flange 78 at a second end of the barrel. A second end face 80 of the unitary flange 78 faces the nut face 40 of the hex nut 38 to provide a circular groove 82 just in front of the hex nut.

Figure 6:
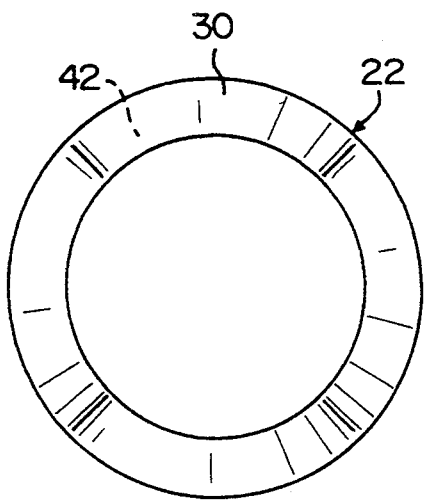
FIG. 6 is a front view of a wave spring used in the spring retainer assembly.
Figure 7:
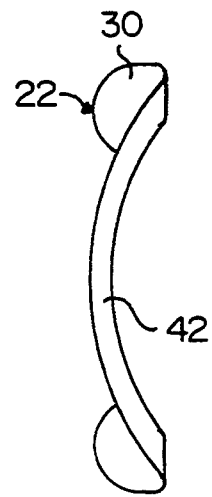
FIG. 7 is a side view of the wave spring of FIG. 6.

Referring now to FIGS. 6 and 7, wave spring 22 has a circular opening 84 therein through which the end coupling 16 (FIG. 3) is received. Since the wave spring 22 is resilient and flexible, it is snapped over the unitary flange 78 of the end coupling 16 (see FIG. 4) so as to seat in the circular groove 82 and is thus retained between nut face 40 and the flange face 80. In a specific embodiment, the wave spring 22 is model number SSR-0087, available from the Smalley Corporation and listed in Smalley Catalog RR-89.

Figure 8:
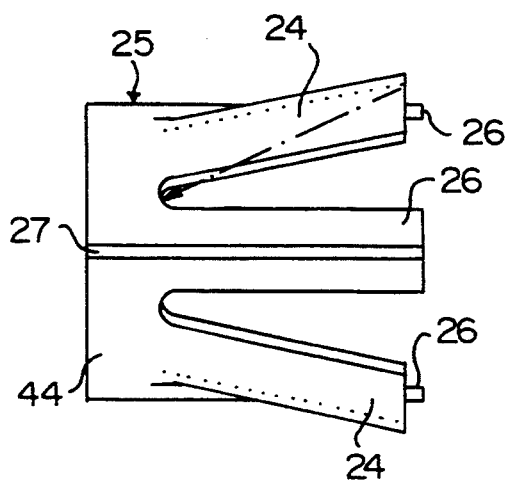
FIG. 8 is a side view of a spring anchor used in the spring assembly.
Figure 9:
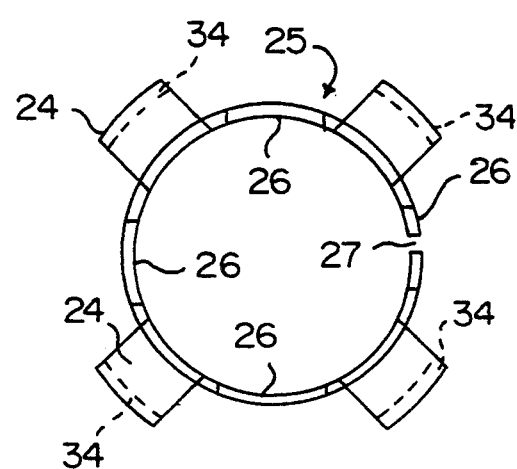
FIG. 9 is an end view of the spring anchor of FIG. 8.

Referring now to FIG. 8 and 9, it is seen that the anchor spring 25 is a unitary member. Preferably, the anchor spring 25 is made of SAE 1050-1080 steel having a thickness of about 0.025 inch. After being formed, the anchor spring 25 is quenched and tempered to Rc42-48 and is then zinc-plated and covered with an olive drab coating.

Considering the anchor spring 25 more specifically, the collar portion 28 of the spring 25 surrounds the cylindrical outer surface 72 of the barrel 70 (see FIG. 4) so that the end shoulder 74 of the end coupling 16 abuts the collar 28, holding the anchor spring on the barrel. The wave spring 22 is already in place in the groove 82 of the end coupling 16 when the anchor spring 25 is mounted on the end coupling. The axially extending stabilizing tangs 26 lie along the surface 72 of the barrel 70 and define a diameter less than the unitary flange 76 so as to axially retain the anchor spring 26 on the end coupling 16. Since the thickness of the anchor tangs 24 is less than the diameter of the flange 76, the anchor tangs clear the edge of the opening 14 as they are squeezed when anchor spring 25 is pushed from the FIG. 1 to the FIG. 2 position. Upon mounting the anchor spring 25 on the end coupling 16, the anchor spring 25 cooperates with the wave spring 22 to provide the two-part retaining spring assembly 50 of FIGS. 1 and 2.

The spring assembly 50 allows an installer to secure the end coupling 16 of the hose 18 to the bracket 10 by simply pushing the end coupling through the hole 14 in the bracket 10. No additional tools or operations are needed to accomplish this assembly, thus minimizing the possibility of a mistake and increasing the reliability of the resulting connection.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an assembly including a hose and an end coupling connected to the hose, wherein the end coupling includes a barrel with first and second ends, the first end being coupled to the hose and the second end being passed through an opening of a selected diameter in a panel when the barrel is retained in the opening, the improvement comprising:

a groove proximate the first end of the barrel and a shoulder facing the groove proximate the second end of the barrel;

a spring washer disposed in the groove, means for retaining said spring washer in said groove, the spring washer having a diameter greater than the diameter of the opening through the panel to engage a first surface of the panel when the barrel is inserted through the opening;

an anchor spring disposed around the barrel in proximity with the shoulder at the second end of the barrel intermediate said shoulder and said spring washer, the anchor spring having a collar abutting the shoulder and radially expanded resilient portions, the radially expanded resilient portions being radially contractable from a diameter greater than the opening through the panel to a diameter less than the opening through the panel, wherein the radially expanded resilient portions contract upon inserting the barrel through the opening and re-expand engaging a second surface of the panel to cooperate with the spring washer so as to form a spring assembly for retaining the end coupling in the opening of the panel.

2. The improvement of claim 1, wherein the spring washer is a wave spring.

3. The improvement of claim 2, wherein said means includes a flange juxtaposed with the anchor spring and a face of a nut unitary with the end coupling at the first end of the barrel.

4. The improvement of claim 3, wherein the expanded resilient portions of the anchor spring are flared spring tangs cantilevered on the collar and having free ends for engaging the second surface of the panel.

5. The improvement of claim 4, wherein the anchor spring further includes a plurality of stabilizing tangs projecting from the collar toward the first end of the barrel and engaging the barrel to stabilize the spring anchor on the barrel.

6. The improvement of claim 5, wherein the anchor spring is split to facilitate mount of the anchor spring on the barrel.

7. The improvement of claim 1, wherein the expanded resilient portions of the anchor spring are flared spring tangs cantilevered on the collar and having free ends for engaging the second surface of the panel.

8. The improvement of claim 7, wherein the anchor spring further includes a plurality of stabilizing tangs projecting from the collar toward the first end of the barrel and engaging the barrel to stabilize the spring anchor on the barrel.

9. The improvement of claim 8, wherein the anchor spring is split to facilitate mount of the anchor spring on the barrel.

10. The improvement of claim 1, wherein the spring washer is a single wave spring and wherein the radially expanded resilient portions are spring tangs.

11. The improvement of claim 10, wherein the hose is a reinforced hydraulic brake hose and the panel is a bracket attached to the chassis of a motor vehicle.

* * * * *